United States Patent
Murphy et al.

(10) Patent No.: US 10,843,347 B1
(45) Date of Patent: Nov. 24, 2020

(54) FLEXIBLE END OF ARM TOOL

(71) Applicant: Amazon Technologies, Inc., Seattle, WA (US)

(72) Inventors: Sean Murphy, Seattle, WA (US); Onkar Dabeer, Redmond, WA (US); Zachary Tokarczyk, Stanton, KY (US)

(73) Assignee: Amazon Technologies, Inc, Seattle, WA (US)

( * ) Notice: Subject to any disclaimer, the term of this patent is extended or adjusted under 35 U.S.C. 154(b) by 0 days.

(21) Appl. No.: 16/141,171

(22) Filed: Sep. 25, 2018

(51) Int. Cl.
*B25J 15/06* (2006.01)
*B25J 19/02* (2006.01)
*B25J 19/04* (2006.01)
*B65G 59/04* (2006.01)

(52) U.S. Cl.
CPC ....... *B25J 15/0666* (2013.01); *B25J 15/0683* (2013.01); *B25J 19/021* (2013.01); *B25J 19/04* (2013.01); *B65G 59/04* (2013.01); *B65G 2201/025* (2013.01)

(58) Field of Classification Search
CPC .... B25J 15/06; B25J 15/0683; B25J 15/0052; B25J 15/0616; B25J 15/065; B25J 15/0691; B25J 9/0084; B25J 15/0666; B25J 19/021; B25J 19/04; B65G 47/918; B65G 47/912; B65G 47/907; B65G 23/06; B65G 59/04; B65G 2201/025; B66C 1/0237; B66C 1/0243; B66C 1/0281; B66C 1/0287; B66F 9/181; B65B 21/18; B65B 21/20
See application file for complete search history.

(56) References Cited

U.S. PATENT DOCUMENTS

| | | | | |
|---|---|---|---|---|
| 6,068,317 A | * | 5/2000 | Park | H01L 21/68 294/87.1 |
| 6,217,093 B1 | * | 4/2001 | Neutel | B65G 47/28 198/468.3 |
| 6,439,631 B1 | * | 8/2002 | Kress | B65G 47/918 294/65 |
| 8,534,727 B2 | * | 9/2013 | Weclawski | B65G 47/918 198/468.3 |
| 9,073,222 B2 | * | 7/2015 | Crosby | B65G 47/918 |
| 2003/0235491 A1 | * | 12/2003 | Subotincic | B25J 15/0052 414/627 |

* cited by examiner

*Primary Examiner* — Stephen A Vu
(74) *Attorney, Agent, or Firm* — Baker Hostetler

(57) ABSTRACT

An end-of-arm-tool (EOAT) can elongate from a retracted position into an extend position to be configured to fit within a space available for contacting and grasping an object. The EOAT includes arrays of linkage elements having corresponding arrays of suction cups attached to linkage element of the linkage element array. In the retracted position, the arrays are pulled away from the distal end of the EOAT to be alongside of a longitudinal rail. In the extended position, a proximal end of the array is moved toward the distal end of the EOAT such that the linkages glide outwardly and linearly to deploy additional suction cups of the suction cup array against the object-to-be-lifted.

17 Claims, 11 Drawing Sheets

FLEXIBLE END OF ARM TOOL

BACKGROUND

The present invention relates to robotics, and more particularly to tools and methods for engaging and lifting items.

The robotics field has developed many tools for engaging and lifting items using end effectors suitable for inventory systems. For example, end effectors sometimes employ suction cups for engaging a surface of an item and using a negative or suction pressure or vacuum to grasp the item. In modern order fulfillment or like facilities, a vast number of sizes, weights of items and/or boxed items are handled.

DETAILED DESCRIPTION OF ILLUSTRATIVE EMBODIMENTS

Modern inventory facilities, such as fulfillment centers, supply chain distribution centers, manufacturing facilities, and the like handle a wide variety of objects. Other facilities, such as sort centers, handle paperboard boxes or the like.

Regardless of the type of facility, many facilities handle a great number of shapes, sizes, weights of items. In some facilities, items may be uncovered but located at the bottom of a columnar opening. For merely one example, access to grasp paperboard boxes from stacked rows or arrays, such as on a pallet or the like, is straightforward if the desired box is on the top row or array but more difficult in other circumstances.

Figure 12:
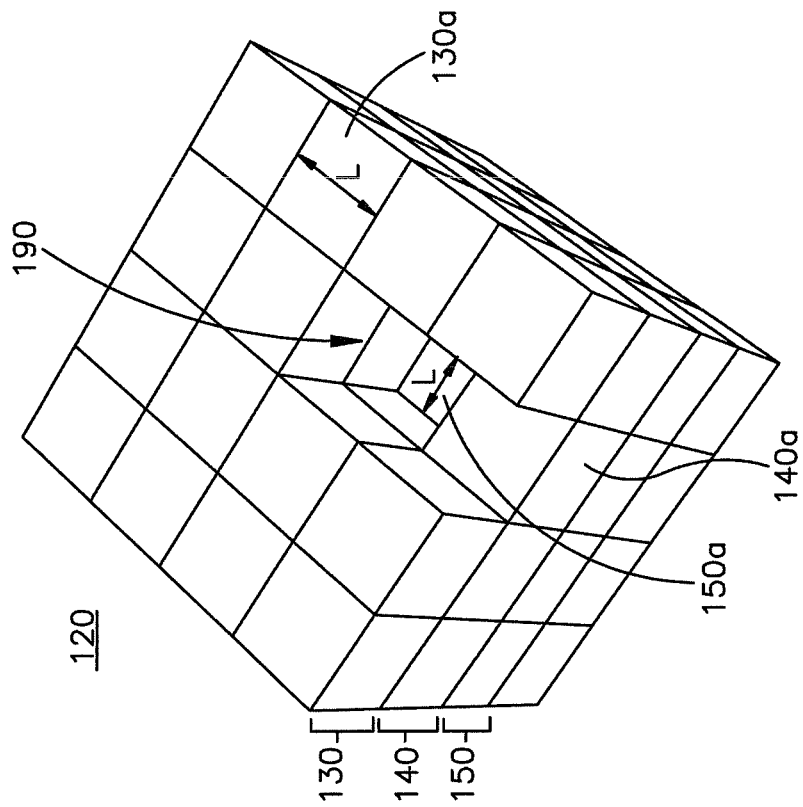
FIG. 12 is a perspective view of a configuration in which the EOAT of FIG. 1 may be employed.

FIG. 12 is a schematic diagram of a pallet 120 of paperboard boxes 99. Top array of boxes 130 can be grasped by, for example, a suction cup-type end effector because the top surfaces are easily accessible. FIG. 12 illustrates two boxes removed from top array 130 and one box removed from second array 140, to create an opening 190 and which exposes the top surface of a box 150a of third array 150 at the bottom of an opening 190. The width and length of box 150a preferably is less than the corresponding width and length of opening 190. The width or length of the opening 190, or alternatively the width or length of box 150a, is an example of a characteristic dimension L, as explained more fully below. FIG. 12 illustrates all boxes having the same dimension for ease of illustration. The tool described herein can be used to reach and grasp boxes or other objects that are together with boxes or objects of disparate sizes, which grouping is referred to as a mixed load.

An end-of-arm-tool (EOAT) disclosed herein includes the capability of conforming to a desired dimension, such as the opening dimension in third array 140 or second array 130 of the boxes. The present invention is not limited to the function of grasping items through a columnar opening (such as opening 190), as this function is merely use of the structure of the end-of-arm-tool described in the figures. Thus, in other circumstances the characteristic dimension can be a width or length of the box itself.

An end-of-arm-tool (EOAT) disclosed in the figures can conform to a desired dimension via a conformable array of suction cups. The EOAT includes a longitudinal rail adapted to be coupled to robotic manipulator means (such as a 6 axis robot, gantry, or any other manipulator); a first linkage element array extends along a first longitudinal side of the rail in a retracted position, and a second linkage element array that extends along an opposing second side of the rail in the retracted position. Each linkage array includes linkage elements that enable the arrays to be flexible in one plane. A first suction cup array has suction cups that are attached to the first linkage element array and a second suction cup array has suction cups that are attached to the second linkage element array. An actuator can move the linkage element arrays. At least some of the linkage elements are unsupported by the rail such that the linkage element array is adapted to laterally extend upon distal movement of the actuator to define an elongated position, thereby elongating or enlarging the footprint of the suction cup array to conform to the size of an object to-be-grasped. The term "unsupported" as used herein means that the particular element is not directly connected to the rail so that the elements can glide away from the rail, which usage is consistent with the meaning according to energy chain and/or cable chain manufacturers.

The linkage element arrays and the suction cup arrays are symmetrical about the longitudinal rail such that the lateral extension of the first and second suction cup arrays is symmetrical. Embodiments in which the linkage element arrays and suction cup arrays are asymmetrical, such as arrays on one side being longer than the other or the arrays being on only one side, are contemplated. The first and second linkage element arrays are coupled (directly or indirectly) to the distal end of the rail. The first and second linkage arrays may be a continuous array of linkage elements that wrap around the distal end of the rail. Alternatively, suction cups may be affixed to the distal end of the rail, with linkage element arrays and/or suction cups extending from the distal end. As illustrated, the EOAT may include two abreast (that is, side-by-side) rows of suction cups. Other configurations are contemplated.

The EOAT may include first and second linear carriages on slide rails on the opposing longitudinal sides of the rail. The first carriage is coupled to a proximal one of the linkage elements of the first linkage element array; the second carriage is coupled to a proximal one of the linkage elements of the second linkage element array. At least one linear actuator is coupled to at least one of the carriages, thereby enabling reciprocating movement of the carriages. The linear actuators can be of any type.

The suction cups preferably are coupled to the linkage elements, such that one suction cup is mounted to each one of the linkage elements in the distal portion of the linkage element array. No suction cup is needed on linkage elements in the proximal portion of the linkage element array (that is, proximal to the point of attachment to the robotic manipulator) that are not intended to contact an object-to-be-lifted while the EOAT is in the extended position.

Biasing springs, such as torsion springs, may bias the linkage element arrays toward the retracted position. The EOAT may include various sensors, such as a proximity sensor (such as a photo-eye or other non-contact type), contact sensor, vacuum sensor, force sensor, acceleration sensor, sensors part of a vision system, or others according to the particular configuration and control system desired. In this regard, a control system may employ sensors and/or a vision system, as will be understood by persons familiar with industrial robotics, to determine the characteristic dimension, control the actuation of EOAT 10, and other functions.

A method of grasping an object using a conformable, suction cup, end-of-arm-tool includes the steps of: positioning the end-of-arm-tool relative to an object to be grasped; determining a characteristic dimension related to an environment of object to be lifted; actuating (that is, extending or retracting) linkage element array to a width that is equal to or less than the characteristic dimension and vertically positioning the end-of-arm-tool; engaging the object with the suction cups; and lifting the object via the suction cups.

The actuation step preferably includes moving (that is, extending and/or retracting) carriages on rails toward a distal end of the end-of-arm-too to glide the linkage element arrays outwardly toward the extended position, thereby deploying suction cups symmetrically on opposing sides of the rail, as needed.

The determining step may include employing a vision system to determine the characteristic dimension, which may be a dimension (width or length) of an item (especially a box) in circumstances in which the EOAT is inserted into a columnar opening through which the object may be accessed. Other means for controlling the positioning and actuating the EOAT, such as information about the object that can be ascertained by upstream information about the boxes and their layouts in arrays and/or local processing related to same, may be employed, as will be understood by persons familiar with conventional robot controls. Alternatively, the characteristic dimension may be the width or length of the opening (columnar or other) within which the EOAT is intended to fit to grasp the box. In this regard, the EOAT dimensionally conforms to its environment as needed. Thus, the box width and length should be at least as large as the corresponding width and length of the opening.

For readily accessible boxes, such as those on a top level of an array (as on a pallet) or a box spaced apart from other objects, the characteristic dimension may be the width or length of the box. Thus, the EOAT can be actuated to its extended position to deploy suction cups in the suction cup arrays, as needed to fit within the characteristic length. Because suction force for a given vacuum pressure depends on suction cup area, deploying suction cups as needed enables the EOAT to conform to the weight of the object. Vacuum supply tubes may go to each suction cup independently, and thus the vacuum may be turned off the suction cups that are not deployed (that is, that do not contact the object and/or that are partially retracted).

Figure 1:
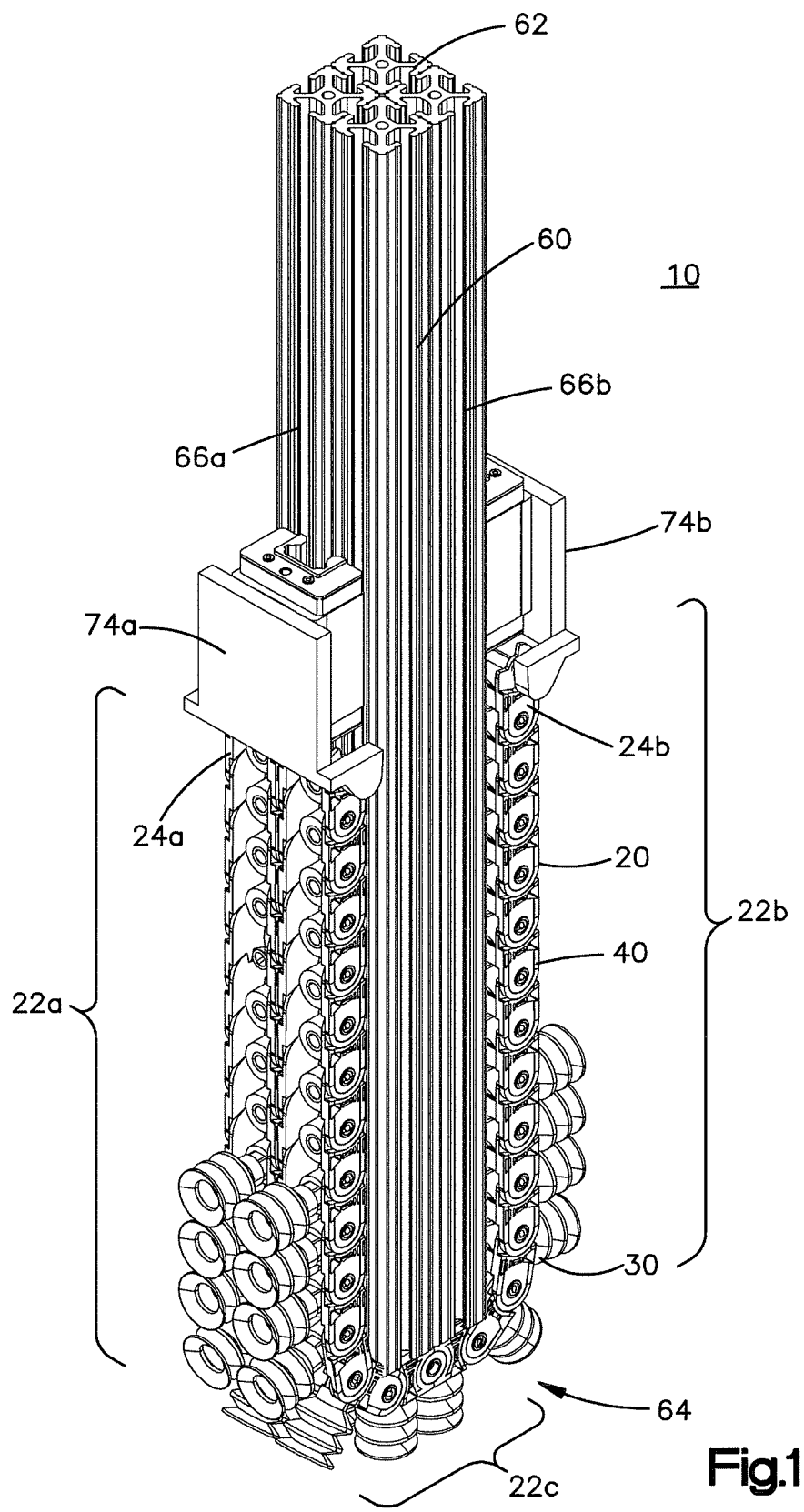
FIG. 1 is a top perspective view of a conformable end-of-arm-tool (EOAT) illustrating aspects of the present invention.
Figure 2:
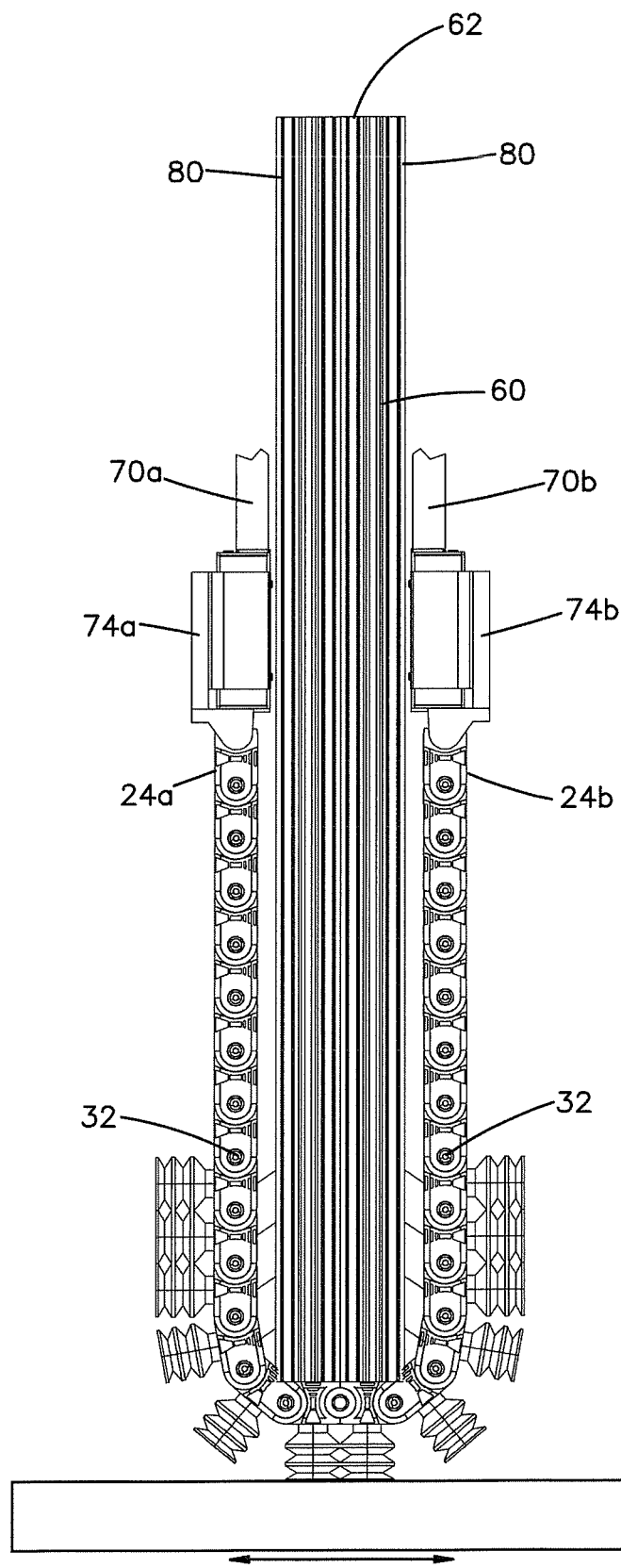
FIG. 2 is a side view of the EOAT of FIG. 1 illustrating a retracted position.
Figure 3:
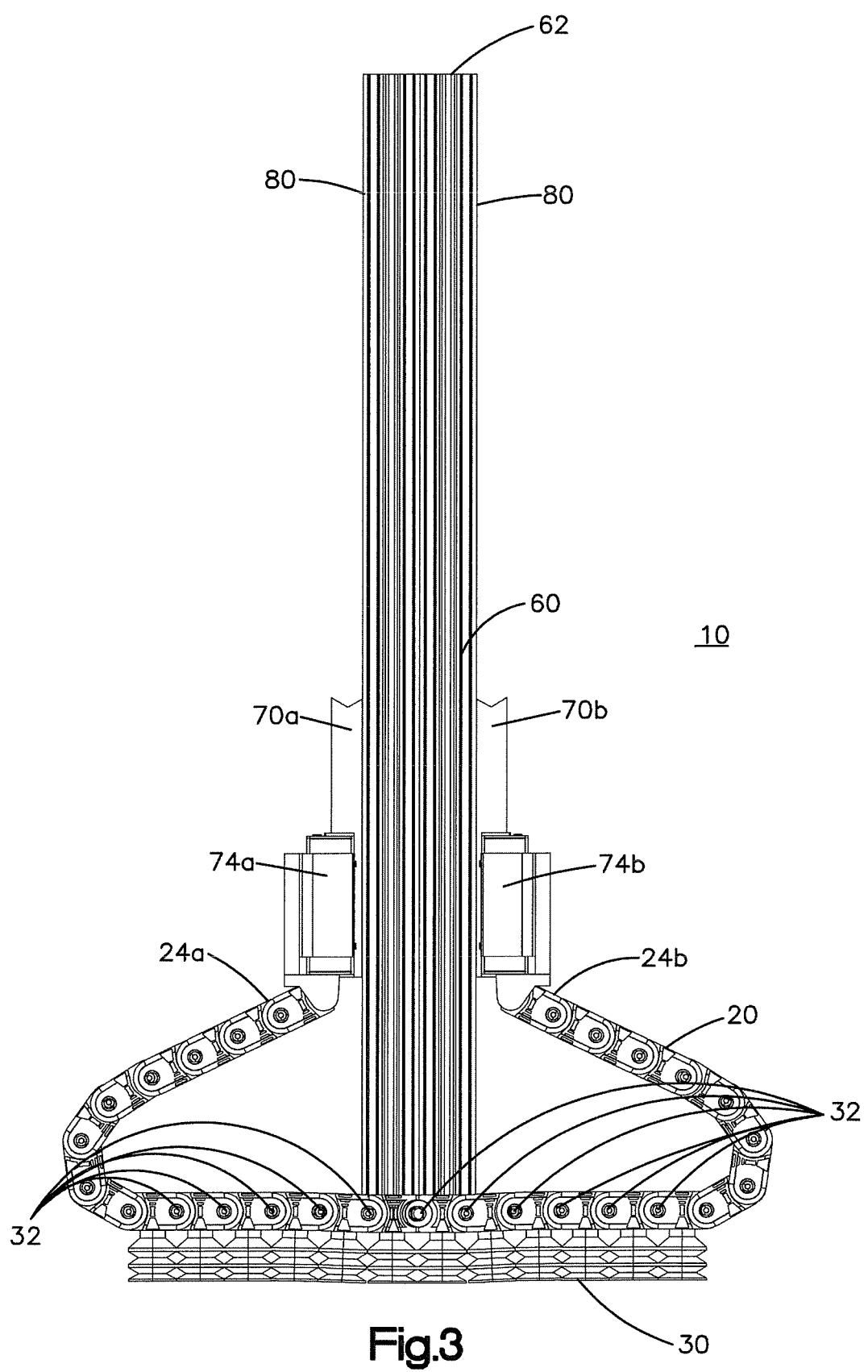
FIG. 3 is a side view of the EOAT of FIG. 1 illustrating an extended position.

As illustrated in the figures, an end-of-arm tool EOAT 10 includes a linkage element array 20, a suction cup array 30, a longitudinal rail 60, slide rails 70 (omitted from FIGS. 1-6 for clarity), and an actuator 80 (shown schematically in FIGS. 2 and 3). Vacuum supply tubes 32 are shown schematically in FIGS. 2 and 3 and extend from a vacuum source (not shown). Supply and control of vacuum is well known.

Rail 60 is illustrated as a quadrant of aluminum extrusions, known as T-track. The rail may be of any structure that is capable of performing some or all of the functions described herein. A proximal end 62 of rail 60 may be attached to a robotic manipulator, such as robotic arm (such as a six axis robot, illustrated in FIG. 11), a gantry, or any other automated manipulator, as will be understood by persons familiar with robotic grippers. The interface between EOAT 10 and the robotic manipulator may be of any type, and preferably is by rigid attachment.

FIG. 1 illustrates EOAT 10 in a retracted position. FIG. 2 illustrates EOAT 10 in its extended position. Any position between the retracted position of FIG. 1 and the extended position of FIG. 2 is contemplated, depending on the characteristic dimension and the particular needs of the application.

Linkage element array 20 includes a first linkage element array 22a, a second linkage element array 22b, and a distal linkage element array 22c. As best illustrated in FIGS. 1 and 2, EOAT 10 is in a retracted position, first and second linage element arrays 22a and 22b are on or near opposing sides 66a and 66b of rail 60, and distal array 22c is on or near distal end 64. As illustrated in the figures, linkage element arrays 22a, 22b, and 22c are formed of individual linkage elements 40. Preferably, arrays 22a 22b, and 22c are formed of a single chain of linkage elements 40.

Figure 9:
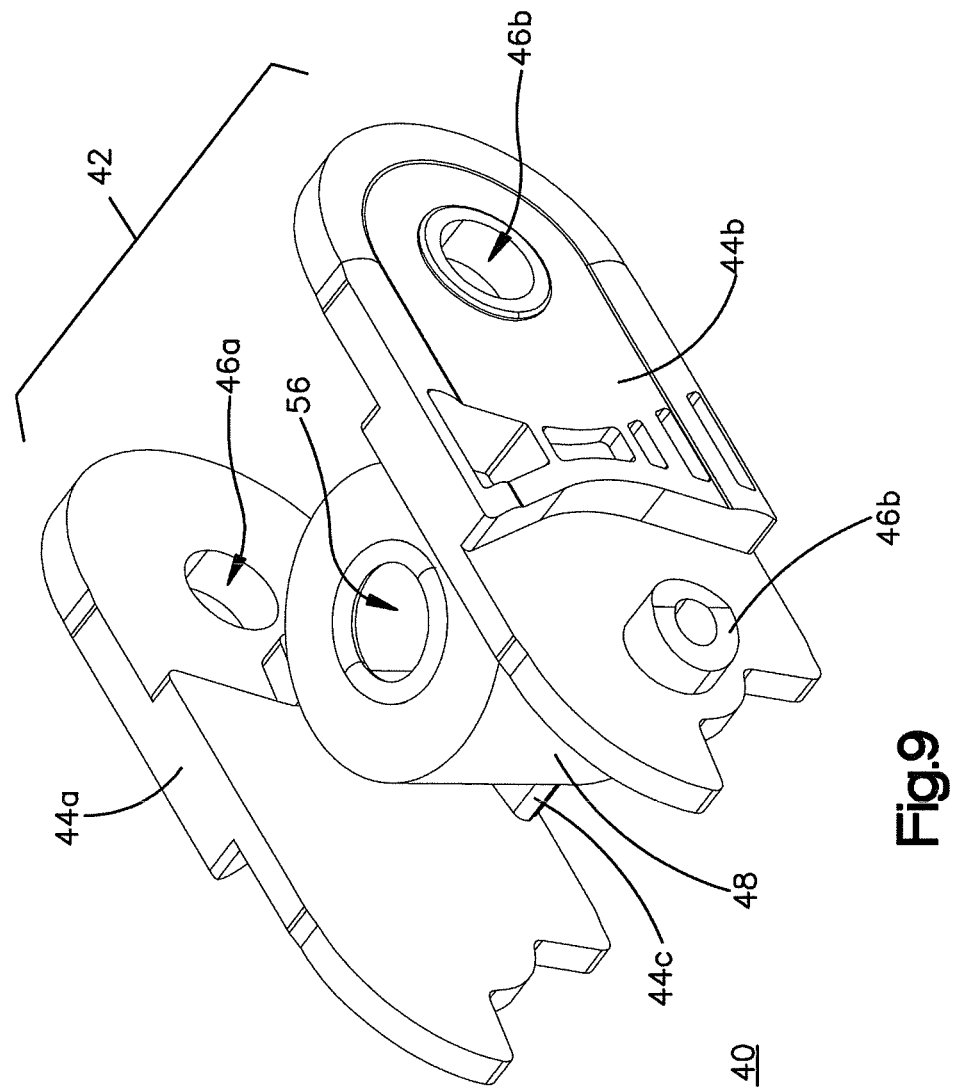
FIG. 9 is enlarged perspective view of a linkage element.
Figure 10:
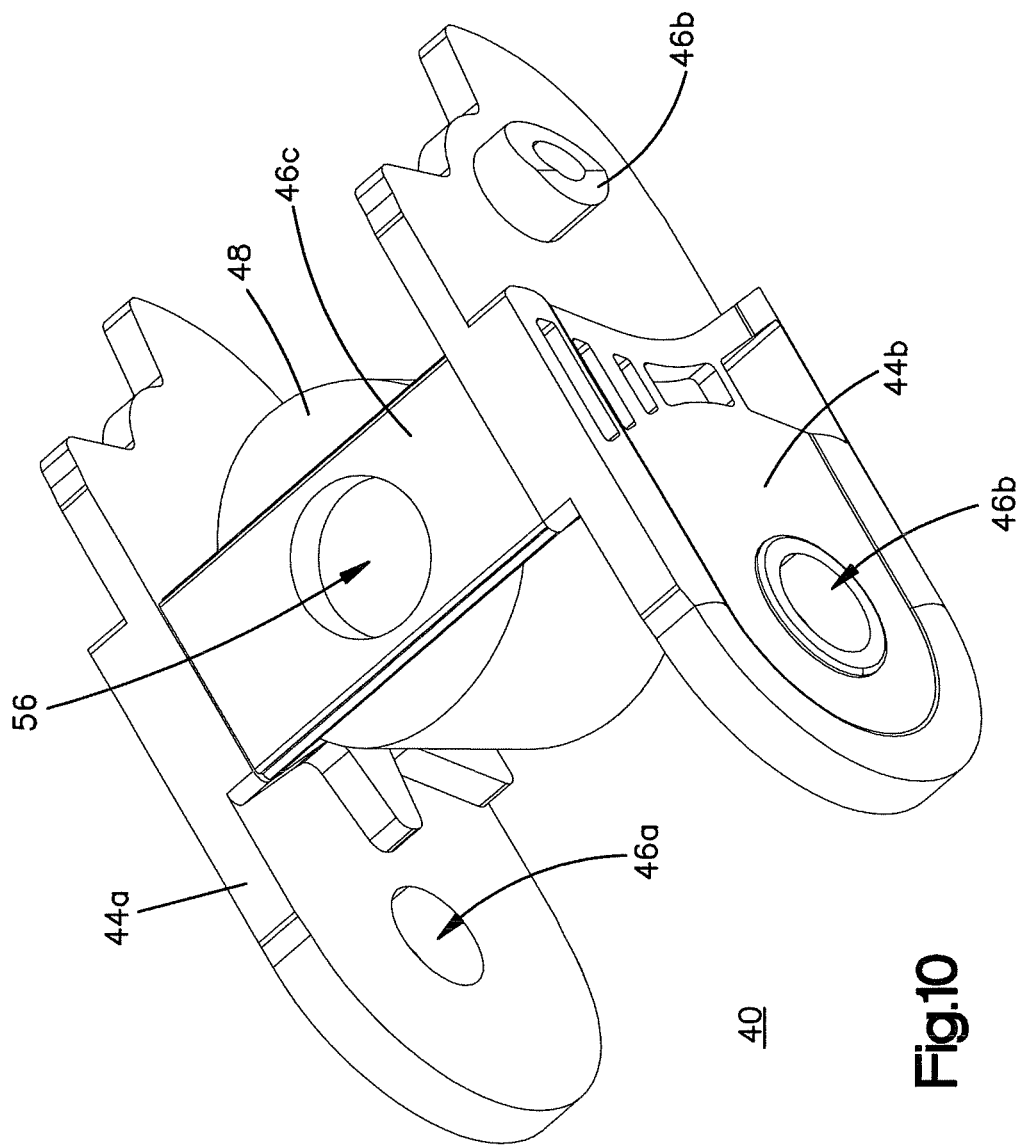
FIG. 10 is view of the linkage element of FIG. 9 from another position.

Linkage element 40 preferably is of the type generally referred to as energy chain or cable chain, as supplied by Igus Inc., Kuka, Fanuc (Leoni), or KabelSchlepp. In this regard, as best illustrated in FIGS. 9 and 10, each linkage element 40, of the version shown in the figures, includes a body 42 formed by opposing rails or sides 44a and 44b that are joined together by a cross rail 44c. Ends of a leading or trailing end of sides 44a and 44b include pins 46a and the other of the leading or the trailing end of sides 44a and 44b. As illustrated for example in FIGS. 1 through 6, pins 46a are coupled with recesses 46b of adjacent elements 40 to form a continuous chain that is flexible (within limits) in a single plane.

Cross rail 44c, as illustrated in the figures, spans between sides 44a and 44b at or near a lower boundary of element 40. Preferably, cross rail 44c includes an aperture 48 through which vacuum pressure can be supplied, such as by a tube 32 (not shown in FIGS. 9 and 10) extending though the aperture 48, a fitting that is inserted into the aperture and to which a vacuum tube is connected, or other configuration. The present invention is not limited to the particular structure of linkage element 40, but rather uses linkage element 40 to illustrate merely one structure that can perform the function (broadly defined) of extending the suction cup array.

Figure 6:
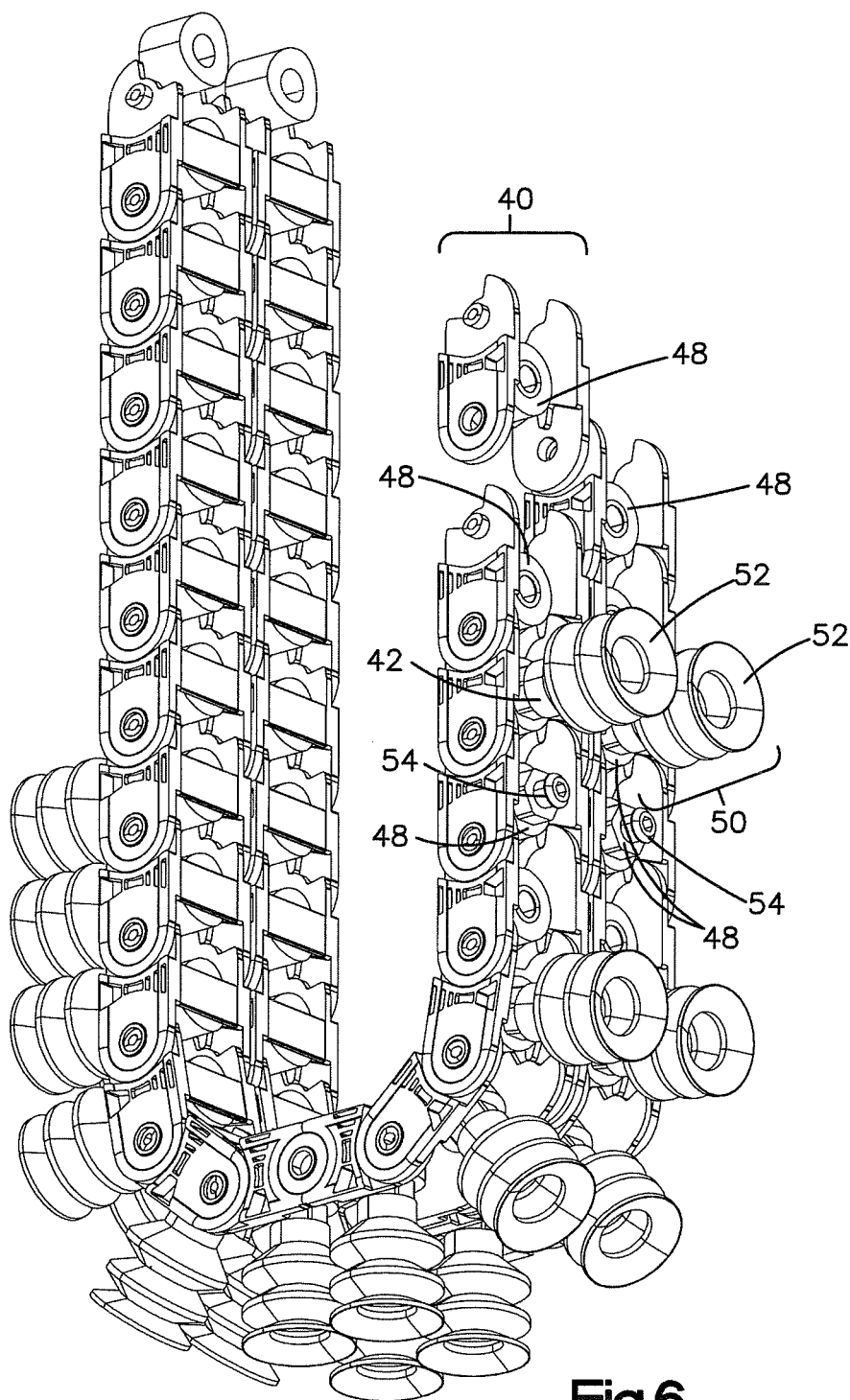
FIG. 6 is a perspective view of a portion of the components of FIG. 5.

A suction cup assembly 50 includes a suction cup base 48, a suction cup 52, and a fitting 54, as best illustrated in FIG. 6. Suction cup base 48 may be a component that is affixed to linkage element 40 or may be an integral to linkage element 40. In this regard, the present invention is not limited to the structure of base 48 or any other portion of the suction cup and/or linkage element described. Rather, the suction cup is coupled to the linkage element, regardless of which components are interpreted to part of the suction cup assembly or linkage element assembly, and whether the suction cup is carried by the linkage elements by direct contact or indirect coupling such that other structures are disposed therebetween. Suction cup base 48 includes an aperture 56 that is aligned with an aperture in cross rail 44*c* (where present).

Fitting 54 is attached to base 48. Suction cup 52 is attached to fitting 54. Preferably, suction cup 52 is a conventional, commercially available suction cap formed of a compliant polymer. The particular size and design of suction cup 52 may be chosen according to known, parameters relating to the intended use, such as weight of each object for each characteristic dimension, the magnitude of the extension of EOAT 10 for each characteristic dimension (which may determine the number of suction cups capable of grasping the object, number of rows of suction cup arrays, magnitude of vacuum pressure, and the like).

Figure 7:
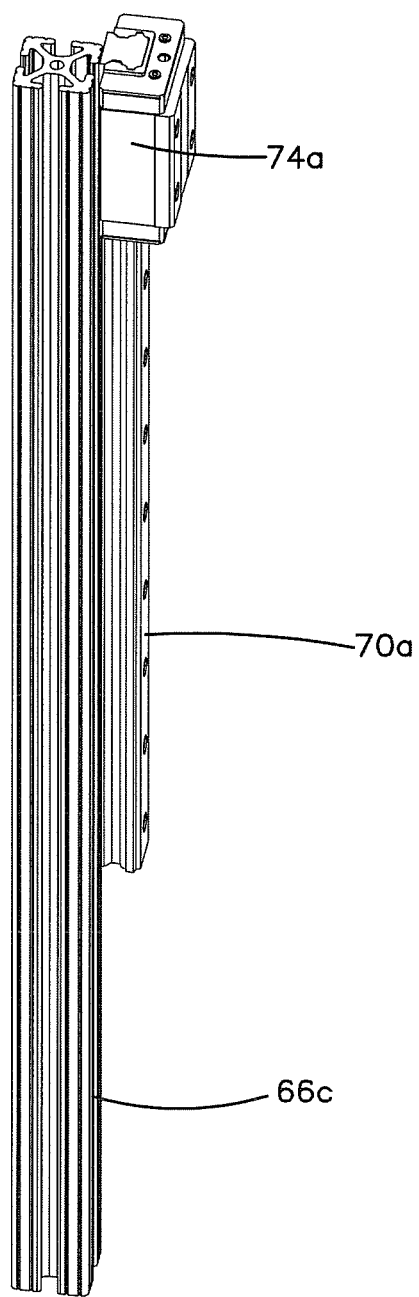
FIG. 7 is a perspective view of the rail and carriage assembly.

Rail 60 includes slide rails 70*a* and 70*b* on corresponding sides 66*a* and 66*b*. Rails 70*a*/70*b*, portions of which are shown schematically in FIGS. 2 and 3, and shown in FIG. 7, extend longitudinally and are affixed to rail 60.

A carriage 74*a* is mounted to slide rail 70*a* and a carriage 74*b* is mounted to slide rail 70*b*. Carriages 74*a* and 74*b* freely slide on rails 70*a* and 70*b*, and can include low friction materials, linear bearings, or other mechanisms that promote linear movement. The rails 70*a*,70*b* have a recess profile that matches the profile of carriages 74*a*,74*b*. Preferably, rails 70*a*,70*b* and carriages 74*a*,74*b* of the types commercially available by various suppliers.

Figure 4:
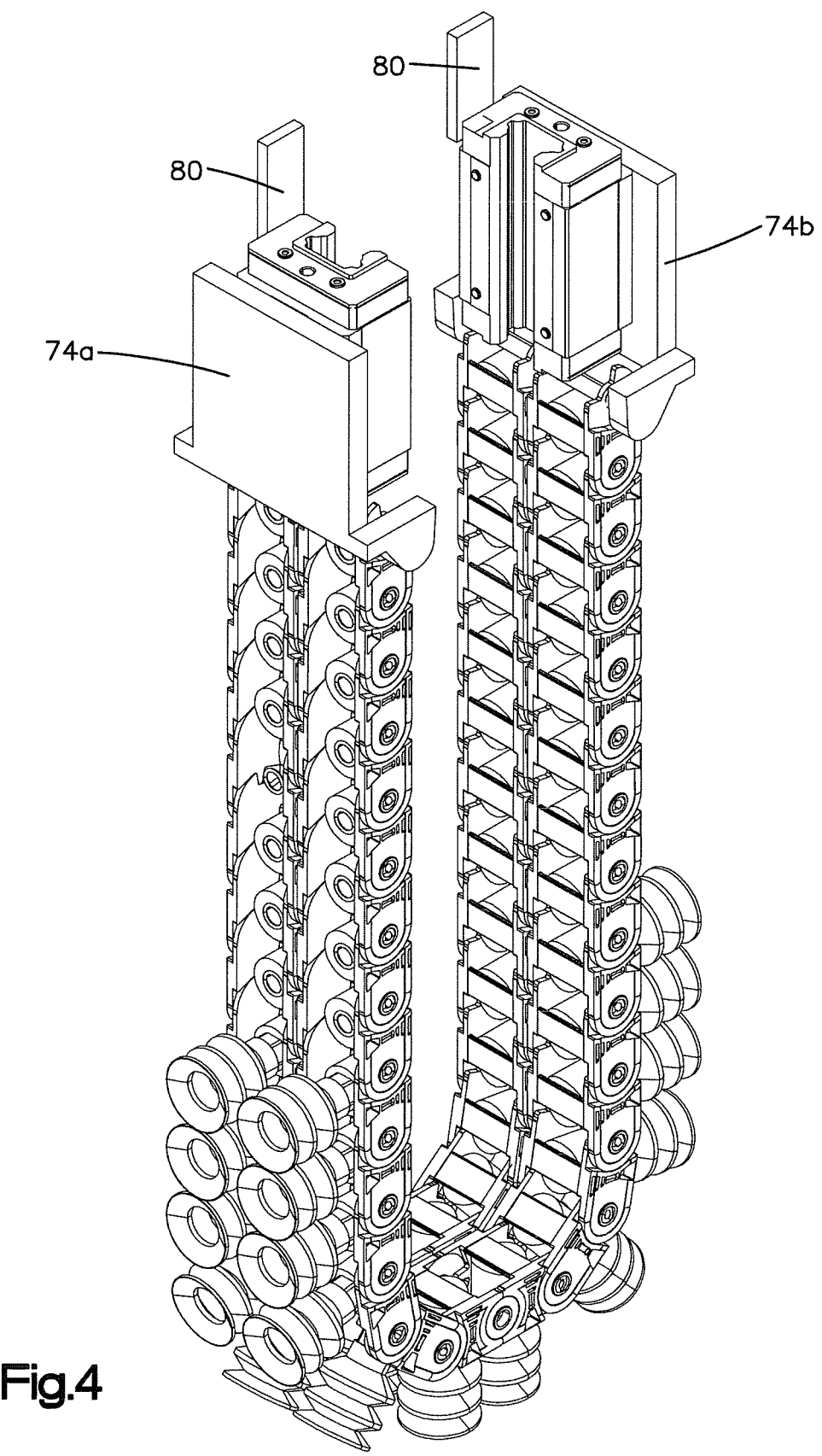
FIG. 4 is a perspective view of the linkage element array and suction cup array of the EOAT of FIG. 1 with some other parts removed for clarity.
Figure 5:
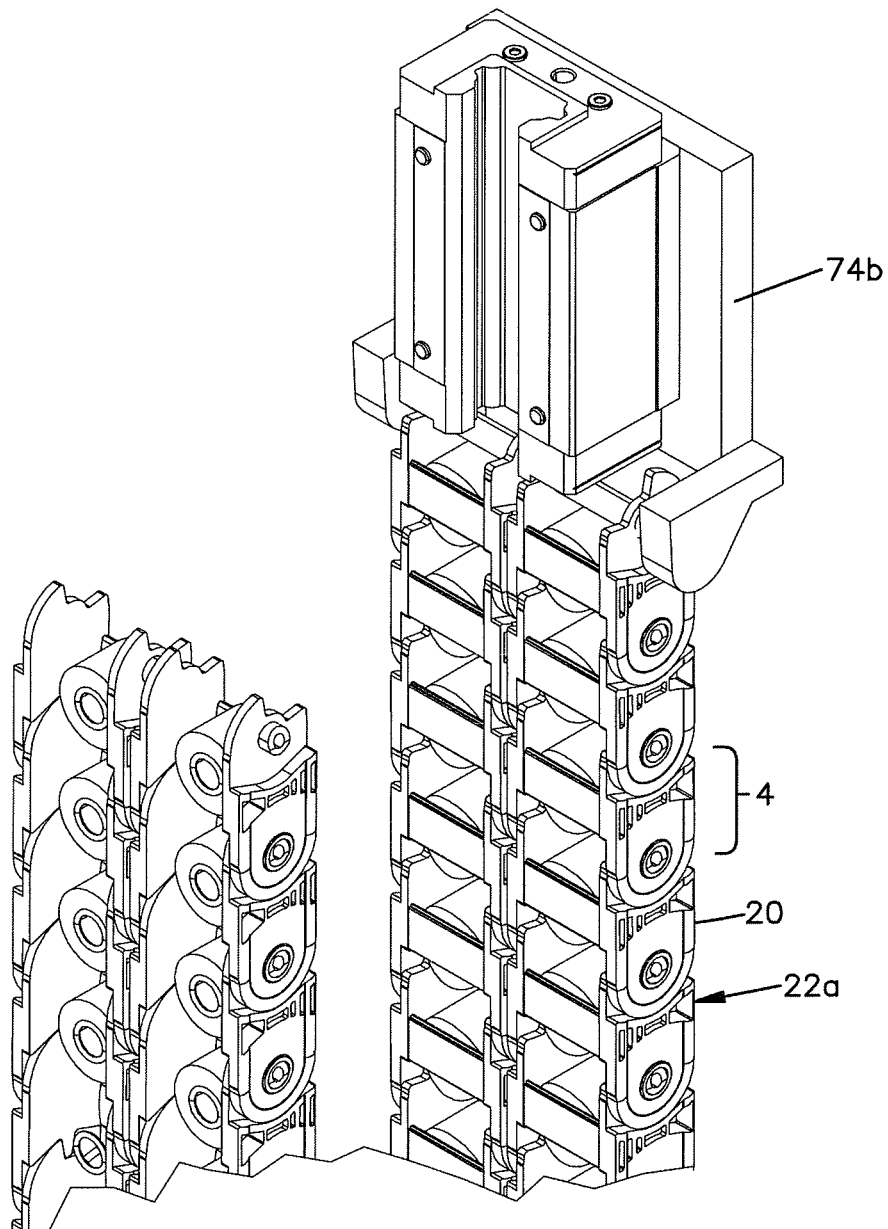
FIG. 5 is a view of components of the linkage element array and suction cup array of the EOAT of FIG. 1, with parts removed for clarity.

Carriages 74*a* and 74*b* are attached to the proximal end of corresponding proximal-most elements 24*a* and 24*b* of linkage elements arrays 22*a* and 22*b*. Carriages 74*a* and 74*b* are actuated by an actuator 80. Actuator 80 preferably is a linear actuator of any type that is capable of moving carriages up and down (that is, retract and extend in the orientation of FIG. 4), including for example, a ball-screw actuator or the like, including a servo motor or stepper motor and any sensors and controls required to control and monitor its movement. Pneumatic, hydraulic, chain drives, electromechanical, or other actuators and/or drives may be employed. Actuator 80 is illustrated schematically in FIG. 4 to illustrate that any linear actuator may be employed, as will be understood by persons familiar with actuation of carriages or rails. FIG. 4 shows a pair of actuators, one for each carriage 74*a* and 74*b*, and the present invention encompasses a single actuator coupled to both carriages for moving the carriages together.

Figure 8:
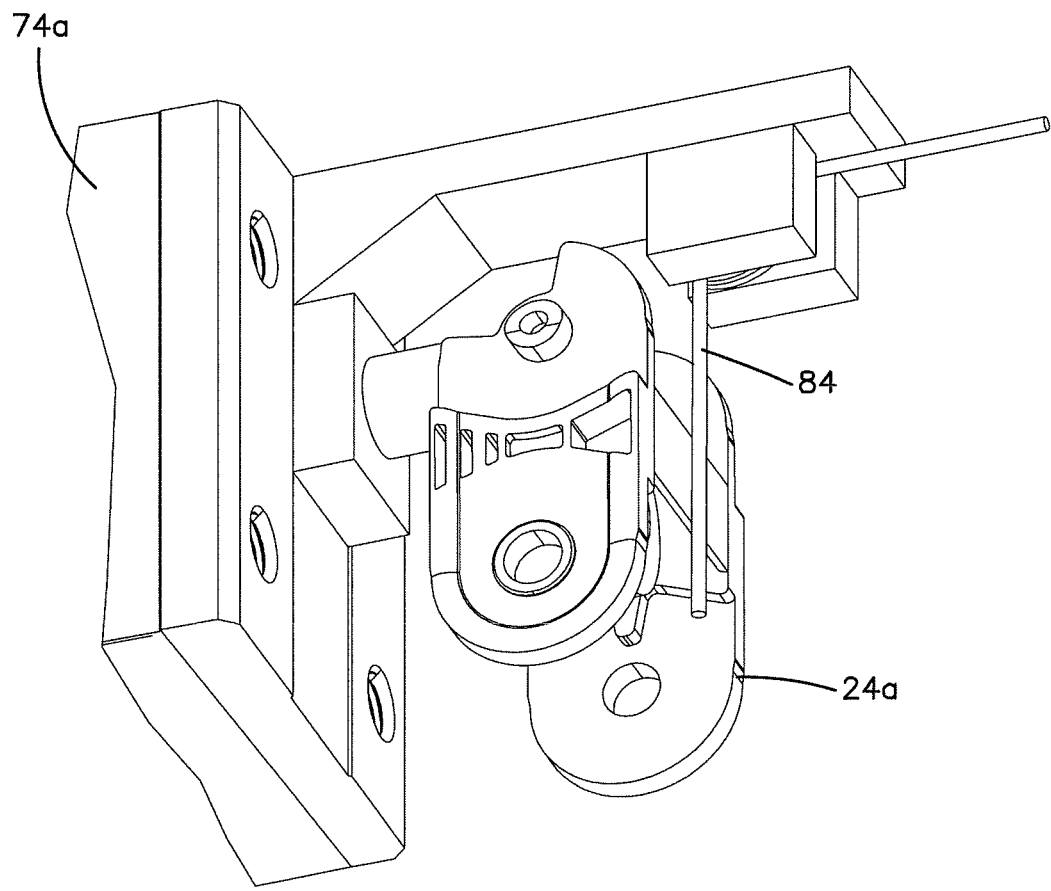
FIG. 8 is an enlarge perspective view of an embodiment of the connection between a carriage and a proximal linkage element and spring.

FIG. 8 illustrates a tension spring 84 attached between a carriage 74*a* and the proximal linkage element 24*a*. Spring 84 applies a torsion force to bias proximal element 24*a* toward a retracted position (that is, parallel to and in contact or near contact with rail 70*a*). A spring 84 may also be located on second carriage 74*a* and at the distal ends of linkage element arrays 22*a* and 22*b* for biasing other of the linkage elements toward the retracted position. Because linkage elements 40 are all linked together, the biasing springs 84 may tend to bias the entire linkage element array 20 to toward the retracted position. Biasing springs are optional, and where existing, may be on any linkage element or plural elements, depending on the desired characteristic of the linkage element arrays.

Figure 11:
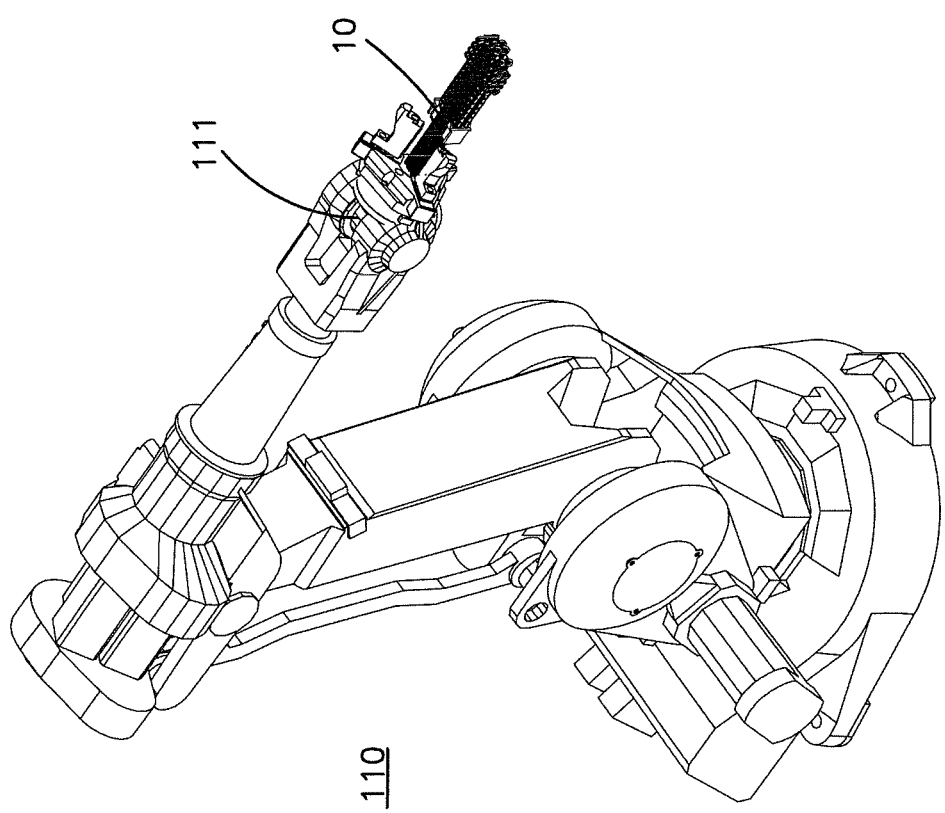
FIG. 11 is a perspective view of an example of a robot of the type that may employ the EOAT of FIG. 1.

A robot system 110 employing EOAT 10 is shown in FIG. 11. Robot 110 shown in the figure is a six axis robot provided merely to illustrate EOAT 10 in use. Referring again to FIG. 12, to illustrate merely one use or function of the EOAT, where a control system determines that EOAT 10 is to grasp a box 130*a* on the uppermost level or array of boxes, EOAT 10 can be positioned by robot 110 over or in contact with the top face of box 130*a* while actuator 80 positions EOAT 10 in the fully retracted position (FIG. 1) or a deployed or partially deployed position.

The suction cups 52 coupled to the distal linkage element array 22*c*, which in the retracted position face in the distal direction, can be engaged to contact the top face of box 130*a*. Actuator 80 may be moved distally to extend linkage element array 20 to an appropriate position that can increase or maximize the number of suction cups 52 deployed for lifting box 130*a* while keeping the width of EOAT 10 within the characteristic dimension, which in this case is the width L of the box 130 (that is, the dimension of box 130*a* that corresponds to direction of deployment of linkage element array 20). Suction applied via the deployed suction cups 52 grasps box 130*a* and robot 110 transports box 130*a* to the desired location.

The process for grasping box 140*a* on the second level or array 140 is the same as described above for first box 130*a*. The control system can take advantage of box 140*a* having an exposed side by orienting EOAT 10 either in an inboard-outboard direction or parallel to the outboard side of boxes, as desired.

To lift box 150*a* at the bottom of columnar opening 190, EOAT 10 is configured to have a width that is less than the characteristic dimension, which in this case is equal to or less than the opening dimension (such as the opening dimension minus a clearance dimension for safety) to enable EOAT 10 to move through opening 190. EOAT 10 can be either in the fully retracted position or in a partially extended position (less than the characteristic dimension) during movement through opening 190.

Upon engaging box 150*a*, actuator 80 may extend EOAT 10 to the desired magnitude (if not already in the fully deployed), and if possible to the fully deployed position shown in FIG. 3. The deployed suction cups 52 can engage the top surface of box 150*a* to grasp and lift box 150*a* through opening 190. Upon release of box 150*a* at the desired destination, EOAT 10 may return to its fully retracted position to ready tool 10 for grasping another object, or EOAT 10 may be deployed to an extended or partially extended consistent with the desired position for lifting the next object. EOAT 10 may, of course, be used to load boxes into a stacked array. In this regard, for example, when loading a mixed load onto a pallet, the EOAT may receive various size boxes randomly and desire to load them in the most efficient manner. The elongation or retraction of the linkage element arrays can aid in loading a mixed load.

The term "coupled" as used herein means connected either directly (that is, with coupled components being in contact) or indirectly (that is, with an additional component or components between the coupled components) joined together.

To illustrate a control system, the position and orientation of the end EOAT may be controlled through instructions from the control system in many, various ways. Specifically, the control system may receive input from a human operator and/or a grasp planning program so as to employ custom grasping strategies for various shapes of items. For example, in relation to suction-type end effectors, six-sided boxes with planar surfaces may require only simple grasping strategies regardless of size and orientation. But items with more complex surfaces or that are not easily accessible, such as object be difficult to grasp, especially if these items are disposed in close proximity to other items and objects, such as when multiple items are disposed in a partially unloaded pallet, may require more complex strategies.

In some embodiments, the control system may receive data from one or more sensors (for example, optical, contact, proximity, etc.) disposed on and/or around the end effector. A vision system may be employed, as will be understood by persons familiar with convention robot control in view of the present specification. This data will be used by the control system to determine surface shapes of the item and objects near the item, where a box is in a pallet, the characteristic dimension, and the like. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two dimensional image of the item showing a feature may allow an identification of a respective surface. If the two dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The end-of-arm tool structure and function are described herein by referring to advantages and specific examples or embodiments. The present invention is not limited to the advantages explained herein, nor to the structure or function of the examples or embodiments. For merely some examples (which are not intended to be limiting), the EOAT shown in the figures includes two row of linkage elements and suction cups, and the present invention contemplates any number of rows, depending on the desired characteristic of the system; the EOAT preferably is symmetric, and an asymmetric configuration is contemplated; the arrays extend in a pair of opposing directions, and more than two arrays that extend orthogonal are contemplated; and suction cups are illustrated, and other interfaces between the arrays and objects (including any impactive, ingressive, astrictive, and/or contigutive structures) for lifting an object are contemplated. Rather, it is intended that the structure and function described herein be applicable to tools having variations in structure and function from that specifically described, as will be understood by persons familiar with end of arm tools, and the invention should be given the full scope of the plain meaning of the claims.

What is claimed:

1. An end-of-arm-tool comprising:
   opposing arrays of linkage elements that are configured to be extended and retracted along a longitudinal rail;
   opposing arrays of suctions cups coupled to corresponding linkage elements, the arrays of suction cups defining a footprint of the end-of-arm tool;
   whereby extending the arrays of linkage elements extends the footprint relative to the longitudinal rail to deploy the suction cups, and retracting the arrays of linkage elements up the longitudinal rail retracts the footprint of the end-of-arm tool, thereby enabling the end-of-arm tool in the retracted position to conform to a desired dimension such that the end-of-arm tool is configured to be inserted into a columnar opening through which an item is to be grasped.

2. The end-of-arm-tool of claim 1 wherein end-of-arm-tool includes carriages coupled to the linkage elements and at least one linear actuator for extending and retracting the carriages.

3. An end-of-arm-tool having a conformable array of suction cups, the end-of-arm-tool comprising:
   a longitudinal rail adapted to be coupled to robotic manipulator means;
   a first linkage element array extending along a first longitudinal side of the rail in a retracted position, a second linkage element array extending along an opposing second side of the rail in the retracted position; each linkage array including linkage elements;
   a first suction cup array having suction cups that are attached to the first linkage element array and a second suction cup array having suction cups that are coupled to the second linkage element array; and at least one actuator that is adapted to move proximal ends of the linkage element arrays alternately distally to elongate a footprint of the suction cup and proximally to shorten the footprint of the suction cup array, and wherein at least some of the linkage elements are unsupported by the rail, thereby enabling elongating of the footprint of the suction cup arrays upon distal movement of the at least one actuator.

4. The end-of-arm-tool of claim 3 wherein the linkage element arrays and the suction cup arrays are symmetrical about the longitudinal rail such that the lateral extension of the first and second suction cup arrays is symmetrical.

5. The end-of-arm-tool of claim 4 wherein the first and second linkage element arrays are coupled to a distal end of the rail.

6. The end-of-arm-tool of claim 4 further comprising first and second linear carriages on opposing longitudinal sides of the rail, the first carriage being coupled to a proximal one of the linkage elements of the first linkage element array, the second carriage being coupled to a proximal one of the linkage elements of the second linkage element array.

7. The end-of-arm-tool of claim 6 wherein at least one linear actuator is coupled to at least one of the carriages, thereby enabling reciprocating movement of the carriages.

8. The end-of-arm-tool of claim 4 wherein the suction cup array is configured such that each one of the suction cups is coupled to corresponding ones of the linkage elements, and a distal end of the array includes suction cups.

9. The end-of-arm-tool of claim 4 wherein each one of the linkage element arrays includes biasing springs to bias the first and second linkage arrays toward the retracted position.

10. The end-of-arm-tool of claim 4 wherein each one of the linkage element arrays includes at least two abreast linkage elements and each one of the suction cup arrays includes at least two abreast suction cups.

11. The end-of-arm tool of claim 4 further comprising at least one of a proximity sensor, vacuum sensor, and force sensor.

12. A method of grasping an object using a conformable, suction cup, end-of-arm-tool, comprising the steps of:
 a. positioning the end-of-arm-tool relative to an object to be grasped, the end-of-arm tool defining a longitudinal direction;
 b. actuating a linkage element array to elongate a footprint of a suction cup array relative to the longitudinal direction and to deploy at least some suction cups of the suction cup array away from the longitudinal direction;
 c. grasping, after the actuating step b, the object with the suction cups carried by the linkage array;
 d. lifting the object via the suction cups; and
 e. releasing, after the lifting step d, the object.

13. The method of claim 12 wherein the actuating step b includes moving carriages on rails oriented in the longitudinal direction toward a distal end of the end-of-arm-tool to glide the linkage element arrays outwardly relative to the longitudinal direction toward an extended position.

14. The method of claim 13 wherein the actuating step includes symmetrical deployment of the linkage element array and the suction cups on opposing sides of the rails.

15. The method of claim 13 further comprising the step of transporting the object after the grasping step c to a destination while the linkage element array and suction cups are deployed.

16. The method of claim 15 further comprising the step of moving the carriages on the rails, after the releasing step, toward a proximal end of the end-of-arm-tool to put the end-of-arm-tool in a ready position.

17. The method of claim 13 further wherein vacuum pressure is supplied only to the deployed suction cups.

* * * * *